United States Patent
Jagota et al.

(10) Patent No.: US 9,740,743 B2
(45) Date of Patent: Aug. 22, 2017

(54) MATCHING OBJECTS USING KEYS BASED ON MATCH RULES

(71) Applicant: salesforce.com, inc., San Francisco, CA (US)

(72) Inventors: Arun Jagota, Sunnyvale, CA (US); Chenghung Ker, Burlingame, CA (US); Parth Vijay Vaishnav, Cupertino, CA (US); Danil Dvinov, San Francisco, CA (US); David Hacker, Arlington, VA (US); Susan Levine, Walnut Creek, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 319 days.

(21) Appl. No.: 14/518,145

(22) Filed: Oct. 20, 2014

(65) Prior Publication Data
US 2016/0110354 A1    Apr. 21, 2016

(51) Int. Cl.
*G06F 17/30* (2006.01)

(52) U.S. Cl.
CPC .............................. *G06F 17/30489* (2013.01)

(58) Field of Classification Search
CPC .................................................. G06F 17/30489
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,003,039 A * | 12/1999 | Barry ................ G06F 17/30563 |
| 6,092,083 A | 7/2000 | Brodersen et al. |
| 6,161,149 A | 12/2000 | Achacoso et al. |

(Continued)

OTHER PUBLICATIONS

U.S. Appl. No. 13/998,890.

(Continued)

*Primary Examiner* — Noosha Arjomandi
(74) *Attorney, Agent, or Firm* — Dergosits & Noah LLP; Todd A. Noah (57) ABSTRACT

Matching objects using keys based on match rules is described. A system generates a match rule key based on a match rule, wherein the match rule specifies whether two objects match. The system creates candidate keys by applying the match rule key to data objects. The system creates a probe key by applying the match rule key to a probe object. The system determines whether the probe key matches a candidate key. The system determines whether the probe object matches a candidate object based on applying the match rule to the probe object and the candidate object if the probe key matches the candidate key corresponding to the candidate object. The system identifies the probe object and the candidate object as matching based on the match rule if the probe object matches the candidate object.

17 Claims, 4 Drawing Sheets

(56) References Cited

U.S. PATENT DOCUMENTS

| | | |
|---|---|---|
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,630 B2* | 11/2009 | Lloyd ............... G06F 17/30067 |
| 7,620,655 B2 | 11/2009 | Larsson |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,400,782 B2* | 7/2016 | Longe ............... G06F 3/0237 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0200336 A1* | 9/2006 | Cipollone ........... G06F 17/2735 704/4 |
| 2009/0063415 A1 | 3/2009 | Chatfield et al. |
| 2009/0094274 A1* | 4/2009 | Gorelik ............. G06F 17/30292 |
| 2009/0100342 A1 | 4/2009 | Jakobson |
| 2009/0177744 A1 | 7/2009 | Marlow et al. |
| 2010/0070460 A1* | 3/2010 | Furst .................. G06N 5/04 707/602 |
| 2010/0076919 A1* | 3/2010 | Chen .................. H04L 12/56 706/48 |
| 2010/0082579 A1* | 4/2010 | Rajaram ........... G06F 17/30607 707/706 |
| 2012/0110022 A1* | 5/2012 | Hoang .............. G06F 17/30014 707/792 |
| 2012/0233137 A1 | 9/2012 | Jakobson et al. |
| 2013/0031089 A1* | 1/2013 | Allen ................. G06F 17/30861 707/723 |
| 2013/0085977 A1* | 4/2013 | Junker .................. G06N 5/025 706/47 |
| 2013/0124564 A1* | 5/2013 | Oztekin .................. G06Q 10/02 707/770 |
| 2013/0218948 A1 | 8/2013 | Jakobson |
| 2013/0218949 A1 | 8/2013 | Jakobson |
| 2013/0218966 A1 | 8/2013 | Jakobson |
| 2014/0114939 A1* | 4/2014 | Spacek ............. G06F 17/30289 707/694 |
| 2015/0074135 A1* | 3/2015 | Beavin .............. G06F 17/30448 707/759 |
| 2015/0121533 A1* | 4/2015 | Gluck .................. G06F 21/577 726/25 |
| 2015/0193511 A1* | 7/2015 | Woody ............. G06F 17/30554 707/722 |

(56) References Cited

U.S. PATENT DOCUMENTS

2016/0110354 A1* 4/2016 Jagota .............. G06F 17/30489
707/692

OTHER PUBLICATIONS

U.S. Appl. No. 13/987,075.
U.S. Appl. No. 13/987,074.
U.S. Appl. No. 13/998,065.
U.S. Appl. No. 13/986,744.
U.S. Appl. No. 13/986,251.

* cited by examiner

| Match Rule | Keys |
|---|---|
| F1(R) F2(N) + F3(D) F4(R) | F1(R), F3(D)F4(R) |
| F1(D) F3(R) | F1(D)F3(R) |

| Record | F1(R) value | F3(D)F4(R) value |
|---|---|---|
| (F1=a, F2=b, F3=c, F4=d) | a | cd |
| (F1=null, F2=b, F3=null, F4=d) |  | "null"d |
| (F1=a, F2=b, F3=c, F4=null) | a |  |

| Object | F1 | F2 | F3 | F4 |
|---|---|---|---|---|
| X | a | b | null | d |
| Y | null | e | null | d |
| M | 3 | 0 | 1 | 2 |

MATCHING OBJECTS USING KEYS BASED ON MATCH RULES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

A match rule inputs two objects and returns true if the two objects match and returns false if the two objects do not match. One use case of a match rule is to de-duplicate database objects, such as business contacts, leads, or accounts, which may number into the millions is some databases. If the objects have fields, a match rule may be a Boolean formula on a subset F1, F2, . . . Fn of these fields.

A match rule is intentionally agnostic to the specifics of how a match of two objects is defined on any given field. For any field Fi, a Fi specific matcher returns true when two given objects match on the field and false if the two given objects do not match on the field. This matcher may internally do an exact match, or some form of fuzzy match. Different fields may, and typically do, have different matchers. In the following match rule examples, "+" denotes "OR," and the implicit "." denotes "AND." Match rule 1 specifies F1F2+F3F4, which means that two objects match if and only if the two objects match in either both F1 and F2 or in both F3 and F4. Match rule 2 specifies F1+F2+F3+F4, which means that two objects match if and only if the two objects match in at least one of their four fields. Match rule 3 specifies (F1+F2)(F3+F4), which means that two objects match if and only if they match in F1 or F2, and also match in F3 or F4.

When a set of objects to be matched, such as a database to be de-duplicated, is large, such as in the millions, comparing every pair of objects using a match rule is too slow. To speed up processing in this situation, some database systems resort to an approach called blocking, which involves generating one or more keys for each object in the collection. The keys are generated in such a way that objects that are likely to match tend to have the same value for at least one of the keys. For example, a database system receives a new object, denoted as a probe, which is being considered for insertion into the system's database, and needs to check if the probe is a duplicate of any of the millions of database objects.

The blocking approach generates suitable keys from the probe and finds all objects, denoted as candidates, in the database having at least one key value in common with the probe's keys. The candidates are then, one by one, compared with the probe using a specified match rule. Using suitable keys, this process typically reduces the number of comparisons from millions of objects in the database to only hundreds of candidates which share a key value with the probe.

One of the simplest blocking approaches is to create a key for each field Fi, i=1, 2, . . . n. Let O=(v1, v2, . . . vn) denote an object, where vi is the value of field Fi. The object is placed in n keys, Fi=ci(vi), i=1, 2, . . . n. Here Fi is the key name, vi is its value, and ci is a field specific coarsening function. The non-identity ci is used for fuzzy matching. In the examples below, ci(vi) is assumed to equal vi. Table 1 is a simple example, with n=4:

TABLE 1

| Object Id | F1 | F2 | F3 | F4 |
|---|---|---|---|---|
| 1 | a | b | g | h |
| 2 | c | d | j | P |
| 3 | e | f | l | R |
| 4 | a | d | g | Y |

The key map for the data in Table 1 is depicted in Table 2.

| Key name | F1 | F1 | F1 | F2 | F2 | F2 | F3 | F3 | F3 | F4 | F4 | F4 | F4 |
|---|---|---|---|---|---|---|---|---|---|---|---|---|---|
| Key value | a | c | e | b | d | f | g | j | l | h | p | r | y |
| Object Id(s) | {1, 4} | {2} | {3} | {1} | {2, 4} | {3} | {1, 4} | {2} | {3} | {1} | {2} | {3} | {4} |

The main drawback of this approach is that when a database is large, the size of the candidate list for the probe can be very large. For example, the candidate list for a probe which has a first name value of John and a last name value of Smith will contain all contacts in a database with a first name of John, plus all contacts in the database whose last name is Smith, and probably more contacts as well, which will be a significantly large candidate list for a database which includes millions of contacts.

BRIEF SUMMARY

In accordance with embodiments, there are provided systems and methods for matching objects using keys based on match rules. A match rule key is generated based on a match rule, wherein the match rule specifies whether two objects match. Candidate keys are created by applying the match rule key to data objects. A probe key is created by applying the match rule key to a probe object. A determination is made whether the probe key matches a candidate key. A determination is made whether the probe object matches a candidate object based on applying the match rule to the probe object and the candidate object if the probe key matches the candidate key corresponding to the candidate object. The probe object and the candidate object are identified as matching based on the match rule if the probe object matches the candidate object.

For example, a system converts the match rule Boolean formula for the match rule F1F2+F3F4 into the disjunctive normal form {F1F2, F3F4}, and then defines the keys to be the terms F1F2 and F3F4 of the disjunctive normal form match rule. The system applies the match rule keys of F1F2 and F3F4 to a database object with the F1 value=a, the F2 value=b, the F3 value=c, and the F4 value=d, to create the candidate key ab for F1F2 and the candidate key cd for F3F4. The system applies the match rule keys for F1F2 and F3F4 to a probe object with the F1 value=e, the F2 value=f, the F3 value=g, and the F4 value=h, to create the probe key ef for F1F2 and the probe key gh for F3F4. The system finds all of the candidate objects which have candidate keys with the value ef for F1F2 or the value gh for F3F4. The system applies the match rule to the probe object with the values efgh and a candidate object with candidate keys that match the probe keys to determine whether the probe object matches the candidate object. The system identifies the probe object with the values efgh as a duplicate of an object already stored in the database.

While one or more implementations and techniques are described with reference to an embodiment in which matching object using keys based on match rules is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for matching objects using keys based on match rules. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. Next, mechanisms and methods for matching objects using keys based on match rules will be described with reference to example embodiments. The following detailed description will first describe a method for matching objects using keys based on match rules. Next, tables for matching objects using keys based on match rules are described.

Figure 1:
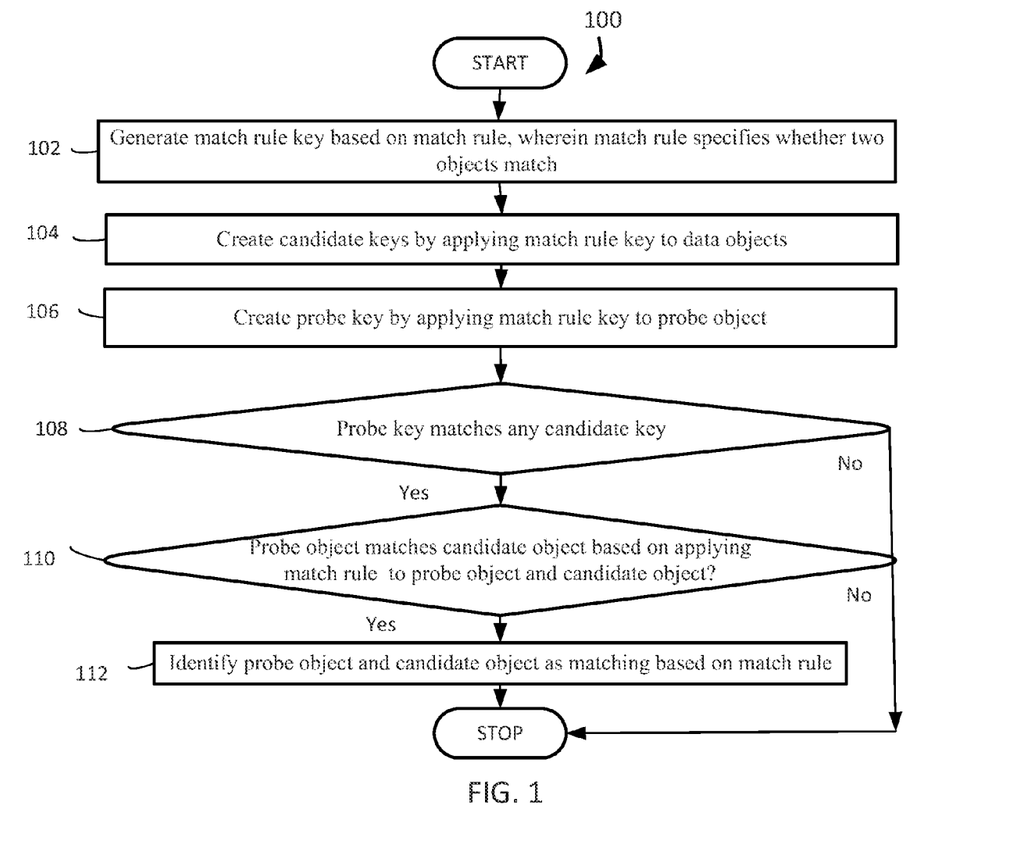
FIG. 1 is an operational flow diagram illustrating a high level overview of a method for matching objects using keys based on match rules, in an embodiment.

FIG. 1 is an operational flow diagram illustrating a high level overview of a method 100 for matching objects using keys based on match rules. As shown in FIG. 1, a database system matches objects using keys based on match rules.

A database system generates a match rule key based on a match rule, wherein the match rule specifies whether two objects match, block 102. For example and without limitation, this can include the database system converting the match rule Boolean formula for the match rule F1F2+F3F4 into the disjunctive normal form {F1F2, F3F4}, and then defining the keys to be the terms F1F2 and F3F4 of the disjunctive normal form match rule. In another example, the database system converts the match rule Boolean formula for match rule F1+F2+F3+F4 into the disjunctive normal form {F1, F2, F3, F4}, and then defines the keys to be the terms F1, F2, F3, and F4 of the disjunctive normal form match rule. In yet another example, the database system converts the match rule Boolean formula for match rule (F1+F2)(F3+F4) into the disjunctive normal form {F1F3, F2F3, F1F4, F2F4}, and then defines the keys to be the terms F1F3, F2F3, F1F4, and F2F4 of the disjunctive normal form match rule. The first two match rules examples were already in disjunctive normal form, such that only the third match rule example needed to be converted. The database system generates keys based on a match rule, such that the narrower that a match rule is, the smaller the candidate list will be.

Having generated a match rule key, the database system creates candidate keys by applying the match rule key to data objects, block 104. By way of example and without limitation, this can include the database system applying the match rule keys of F1F2 and F3F4 to a database object with the F1 value=a, the F2 value=b, the F3 value=c, and the F4 value=d, to create the candidate key ab for F1F2 and the candidate key cd for F3F4. The database system creates candidate keys by applying the match rule key to a data object only when the data object is first added to the database or when the data object is updated in the database.

The value of a key of the form FiFj for an object r is $c_i(r_i) \cdot c_j(r_j)$, where $r_i$ is the value of field Fi in r, $c_i$ the aforementioned coarsening function for field Fi, and $\cdot$ is the concatenation operator. When using identity coarsening functions, two objects with the same value on any key match, which is the property that enables the algorithm to produce small size candidate lists on narrow match rules.

Values of some fields of an object may be missing, such as null values. One way for the database system to cope with missing values is to treat a null value as a particular value, which is referred to as a default match option. However, treating a null value as a particular value may produce undesirable results in certain situations. For example, business contact objects may have many fields, including a field for an email address, and a match rule that uses this email field may specify that two objects match if the two objects have the same value in their email fields. If the database system treats a null value as a particular value, any two business contact objects which are missing email values would be considered as matching because their null values, treated as a particular value, would match, thereby producing undesirable results. Therefore, the database system may treat missing values in an alternative manner, and interpret the email field in the disjunctive normal form version of a match rule as "both objects must have non-empty email address values, and the non-empty email address values must match," which is referred to as a required match option.

The database system may treat null values in yet another manner. For example, the database system may apply a match rule including a term for a first name field, a last name field, a company name field, and a country name field to two business contact objects for which the first name fields match, the last name fields match, and the company name fields match. A system administrator may want this pair of business contact objects to be deemed a match unless both business contact objects have non-empty country name fields and the non-empty country name fields do not match. Therefore, the database system treats the business contact objects as matching when the country name field is missing a value in one of the objects or in both of the objects, and treats the business contact objects as not matching only when there is clear evidence that both countries field include non-empty values and the non-empty values are not matching, which is referred to as a null match option.

The match rule notation is generalized to accommodate such distinctions. In each term of match rules in disjunctive normal form, each of the fields will have one of three match options, the default match option, the required match option, or the null match option. In the following examples of match options, x denotes a non-null value, and x' denotes a non-null value, possibly different than x, which should match x. The default match option matches the pair (null, null) and matches the pair (x, x'). The required match option matches the pair (x, x'). The null match option matches the pair (null, x), matches the pair (x, null), and matches the pair (x, x'). Using this terminology, the desired versions of the two terms discussed in the email and country examples become email(R) and firstname(R) lastname(R) companyname(R) countryname (N), respectively.

Figure 2A:
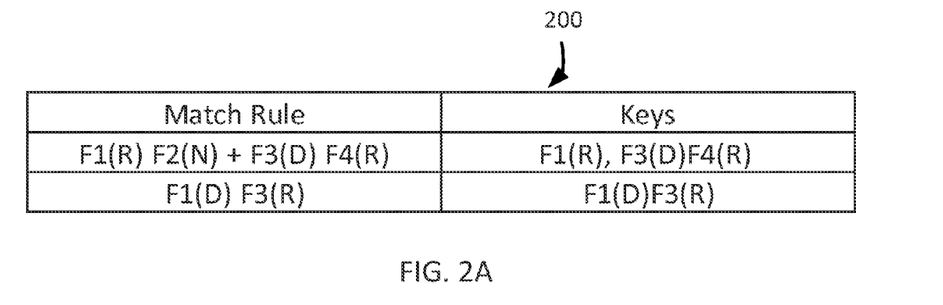
FIG. 2A is a table of examples for matching objects using keys based on match rules, in an embodiment.
Figure 2B:
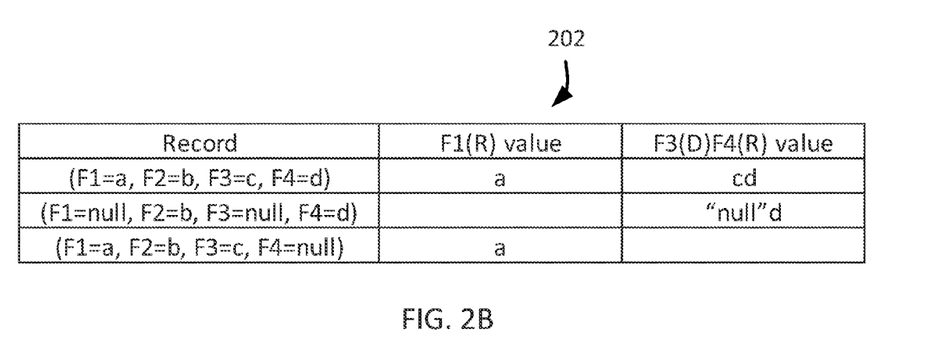
FIG. 2B is a table of examples of applying match rule keys to objects, in an embodiment.

The database system begins with the disjunctive normal form match rules and drops all fields labeled N (null match option) from each term for generating keys, but does not drop all fields labeled N from the actual match rules. Each of the resulting terms becomes a key. In a key, the match option labels on its fields are preserved. A table of example keys based on match rules is depicted in FIG. 2A and described below in the description of FIG. 2A. A table of examples of applying match rule keys to objects is depicted in FIG. 2B and described below in the description of FIG. 2B.

The database system matches a pair of objects using a match rule significantly faster than an algorithm which tests each term in a disjunctive normal form match rule, one by one. The database system builds a custom inverted index from a match option labeled field to all the terms in the disjunctive normal form match rule whose first match option labeled field is the match option labeled field. This processing assumes that the fields in any term in the disjunctive normal form match rule are ordered in increasing order, an assumption which is easily met. The database system builds this index when the match rule is created. The database system efficiently builds this index in one pass over all the terms in the disjunctive normal form match rule. Below is an example of a match rule based on match options and a corresponding inverted index with match option labels.

Match rule: (F1(R) and F2(N)) OR (F1(R) and F3(R)) OR (F3(D) and F4(R))
Inverted index:
F1(R)→F1(R) and F2(N), F1(R) and F3(R)
F3(D)→F3(D) and F4(R)

After applying the match key rule to the data objects to create candidate keys, the database system creates a probe key by applying the match rule key to a probe object, block 106. In embodiments, this can include the database system applying the match rule keys of F1F2 and F3F4 to a probe object with the F1 value=e, the F2 value=f, the F3 value=g, and the F4 value=h, to create the probe key ef for F1F2 and the probe key gh for F3F4.

After applying the match rule to objects to create keys, the database system determines whether the probe key matches any candidate key, block 108. For example and without limitation, this can include the database system finding all of the candidate objects which have candidate keys with the value ef for F1F2 or the value gh for F3F4. If the database system determines that the probe key matches any candidate key, the method 100 continues to block 110. If the database system determines that the probe key does not match any candidate key, the method terminates.

Having determined that the probe key matches a candidate key corresponding to a candidate object, the database system determines whether the probe object matches the candidate object based on applying the match rule to the probe object and the candidate object, block 110. By way of example and without limitation, this can include the database system applying the match rule to the probe object with the values efgh and a candidate object with candidate keys that match the probe keys to determine whether the probe object matches the candidate object. If the database system determines that the probe object matches the candidate object, the method 100 continues to block 112. If the database system determines that the probe object does not match any of the candidate objects, the method terminates.

Two objects, X and Y, with n fields, may be matched as follows.

```
for i ← 1 to n
    Mi ← match-type(Xi, Y i)
    if there is a key in the inverted index for Mi
        evaluate the indexed terms one by one and return true after the
        first one that is true
    end if
end
return false
```

Figure 2C:
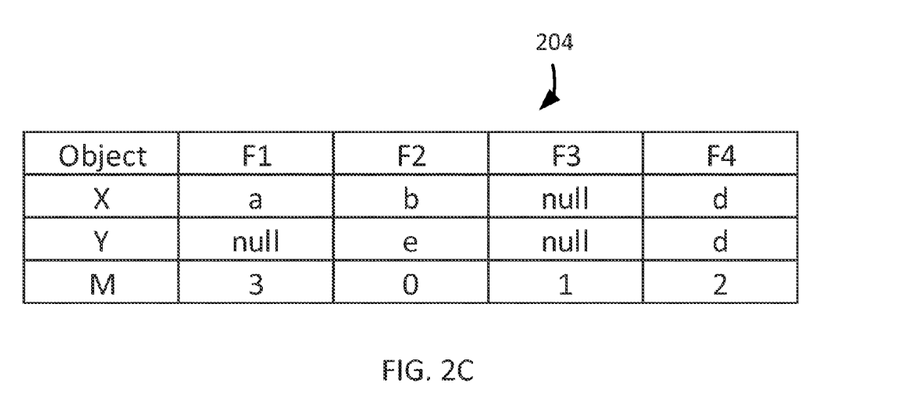
FIG. 2C is a table of examples of objects to be tested for matching based on the match rule, in an embodiment.

Here Mi is match type 0 if (Xi, Yi) is of the form (x, y), Mi is match type 1 if (Xi, Yi) is of the form (null, null), Mi is match type 2 if (Xi, Yi) is of the form (x, x), and Mi is match type 3 if (Xi, Yi) is of the form (null, x) or (x, null). Mi is used in "if there is a key in the inverted index for Mi." An example table of objects to be tested for matching, and their corresponding match type values, are depicted in FIG. 2C and described below in the description of FIG. 2C.

Having determined that the probe object matches the candidate object, the database system identifies the probe object and the candidate object as matching based on the match rule, block 112. In embodiments, this can include the database system identifying the probe key with the values efgh as a duplicate of an object already stored in the database.

The method 100 may be repeated as desired. Although this disclosure describes the blocks 102-112 executing in a particular order, the blocks 102-112 may be executed in a different order. In other implementations, each of the blocks 102-112 may also be executed in combination with other blocks and/or some blocks may be divided into a different set of blocks.

FIG. 2 illustrates example tables 200-204 for matching objects using keys based on match rules, under an embodiment. A table 200 of example keys based on match rules is depicted in FIG. 2A. The database system begins with the disjunctive normal form match rules, which are depicted in the left column in table 200, and drops all fields labeled N (null match option) from each term for generating keys, which are depicted in the left column in table 200, but does not drop all fields labeled N from the actual match rules. Each of the remaining terms becomes a key. In a key, the match option labels on its fields are preserved. For example, the database system drops the field labeled F2(N) from the term F1(R) F2(N) in the match rule depicted in the first data row of the table 200 to create the key F1(R) in the first row if the table 200.

A table 202 of examples of applying match rule keys to objects is depicted in FIG. 2B. This depiction is for the match rule which has its keys depicted in the first data row of the table 200. In the table 202, a blank cell denotes a null key value, which are neither indexed, nor looked up. For example, since the value for F1 is null in the second data row of the table 202, and the F1(R) key requires a data value, the F1(R) value is depicted as a blank cell in the second row of the table 202.

An example table 204 of objects to be tested for matching, and their corresponding match type values, are depicted in FIG. 2C. The match rule applied to the data objects X and Y is the match rule depicted in the previous example:
Match Rule: (F1(R) and F2(N)) OR (F1(R) and F3(R)) OR (F3(D) and F4(R))
The database system generates the inverted index from this match rule:
F1(R)→F1(R) and F2(N), F1(R) and F3(R)
F3(D)→F3(D) and F4(R)

As depicted in the table 204, the X and Y values for F1 correspond to match type 3, which is the null match option. However, the inverted index includes only the required match option for F1 for pointers that begin with F1, such that F1 cannot match the objects X and Y. As depicted in the table 204, the X and Y values for F2 correspond to match type 0, which is the no match designation. Even if the X and Y values for F2 corresponded to any of the match options, the inverted index does not include any match options, or any terms, for pointers that begin with F2, such that F2 cannot match the objects X and Y.

As further depicted in the table 204, the X and Y values for F3 correspond to match type 1, which is the default match option. The inverted index includes the default match option for pointers that begin with F3, such that F3 can match the objects X and Y, provided that the rest of the term pointed to by the pointer F3(D) in the inverted index is satisfied. The rest of the term pointed to by the pointer F3(D) in the inverted index is F4(R). As depicted in the table 204, the X and Y values for F4 correspond to match type 2, which is the required match option. The inverted index includes the required match option for F4 for pointers that begin with F3, such that F4 can match the objects X and Y, provided that the rest of the term in the inverted index pointed to by F3 is satisfied. Since both values for the term F3(D) and F4(R) pointed to by F3 are satisfied, the database system identifies the objects X and Y as matching based on the corresponding match rule.

System Overview

Figure 3:
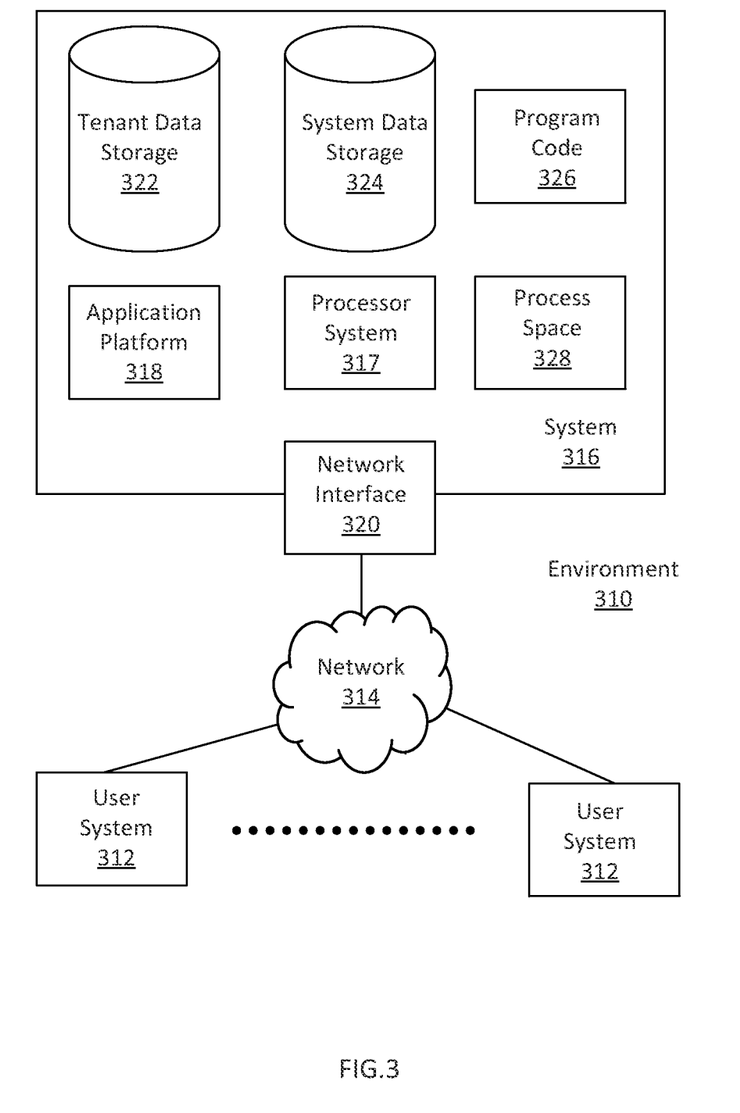
FIG. 3 illustrates a block diagram of an example of an environment wherein an on-demand database service might be used.

FIG. 3 illustrates a block diagram of an environment 310 wherein an on-demand database service might be used. The environment 310 may include user systems 312, a network 314, a system 316, a processor system 317, an application platform 318, a network interface 320, a tenant data storage 322, a system data storage 324, program code 326, and a process space 328. In other embodiments, the environment 310 may not have all of the components listed and/or may have other elements instead of, or in addition to, those listed above.

The environment 310 is an environment in which an on-demand database service exists. A user system 312 may be any machine or system that is used by a user to access a database user system. For example, any of the user systems 312 may be a handheld computing device, a mobile phone, a laptop computer, a work station, and/or a network of computing devices. As illustrated in FIG. 3 (and in more detail in FIG. 4) the user systems 312 might interact via the network 314 with an on-demand database service, which is the system 316.

An on-demand database service, such as the system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 316" and the "system 316" will be used interchangeably herein. A database image may include one or more database objects. A relational database management system (RDMS) or the equivalent may execute storage and retrieval of information against the database object(s). The application platform 318 may be a framework that allows the applications of the system 316 to run, such as the hardware and/or software, e.g., the operating system. In an embodiment, the on-demand database service 316 may include the application platform 318 which enables creation, managing and executing one or more applications developed by the provider of the on-demand database service, users accessing the on-demand database service via user systems 312, or third party application developers accessing the on-demand database service via the user systems 312.

The users of the user systems 312 may differ in their respective capacities, and the capacity of a particular user system 312 might be entirely determined by permissions (permission levels) for the current user. For example, where a salesperson is using a particular user system 312 to interact with the system 316, that user system 312 has the capacities allotted to that salesperson. However, while an administrator is using that user system 312 to interact with the system 316, that user system 312 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 314 is any network or combination of networks of devices that communicate with one another. For example, the network 314 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 312 might communicate with the system 316 using TCP/IP and, at a higher network level, use other common Internet protocols to communicate, such as HTTP, FTP, AFS, WAP, etc. In an example where HTTP is used, the user systems 312 might include an HTTP client commonly referred to as a "browser" for sending and receiving HTTP messages to and from an HTTP server at the system 316. Such an HTTP server might be implemented as the sole network interface between the system 316 and the network 314, but other techniques might be used as well or instead. In some implementations, the interface between the system 316 and the network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 316, shown in FIG. 3, implements a web-based customer relationship management (CRM) system. For example, in one embodiment, the system 316 includes application servers configured to implement and execute CRM software applications as well as provide related data, code, forms, webpages and other information to and from the user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 316 implements applications other than, or in addition to, a CRM application. For example, the system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of the system 316 is shown in FIG. 3, including the network interface 320, the application platform 318, the tenant data storage 322 for tenant data 323, the system data storage 324 for system data 325 accessible to the system 316 and possibly multiple tenants, the program code 326 for implementing various functions of the system 316, and the process space 328 for executing MTS system processes and tenant-specific processes, such as running applications as part of an application hosting service. Additional processes that may execute on the system 316 include database indexing processes.

Several elements in the system shown in FIG. 3 include conventional, well-known elements that are explained only briefly here. For example, each of the user systems 312 could include a desktop personal computer, workstation, laptop, PDA, cell phone, or any wireless access protocol (WAP) enabled device or any other computing device capable of interfacing directly or indirectly to the Internet or other network connection. Each of the user systems 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 312 to access, process and view information, pages and applications available to it from the system 316 over the network 314. Each of the user systems 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 316 or other systems or servers. For example, the user interface device may be used to access data and applications hosted by the system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 312 and all of its components are operator configurable using applications, such as a browser, including computer code run using a central processing unit such as an Intel Pentium® processor or the like. Similarly, the system 316 (and additional instances of an MTS, where more than one is present) and all of their components might be operator configurable using application(s) including computer code to run using a central processing unit such as the processor system 317, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring the system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 316 is configured to provide webpages, forms, applications, data and media content to the user (client) systems 312 to support the access by the user systems 312 as tenants of the system 316. As such, the system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4:
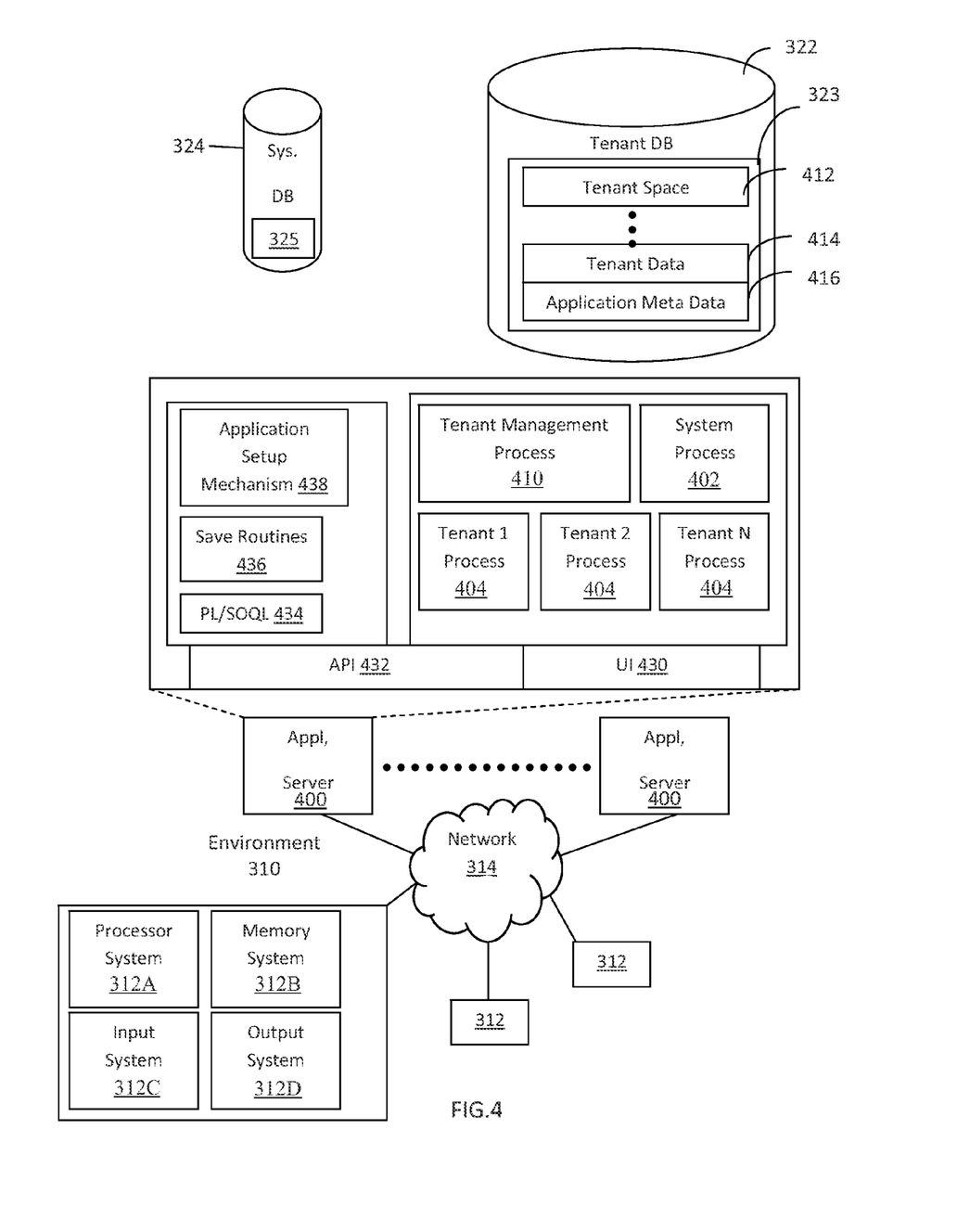
FIG. 4 illustrates a block diagram of an embodiment of elements of FIG. 3 and various possible interconnections between these elements.

FIG. 4 also illustrates the environment 310. However, in FIG. 4 elements of the system 316 and various interconnections in an embodiment are further illustrated. FIG. 4 shows that the each of the user systems 312 may include a processor system 312A, a memory system 312B, an input system 312C, and an output system 312D. FIG. 4 shows the network 314 and the system 316. FIG. 4 also shows that the system 316 may include the tenant data storage 322, the tenant data 323, the system data storage 324, the system data 325, a User Interface (UI) 430, an Application Program Interface (API) 432, a PL/SOQL 434, save routines 436, an application setup mechanism 438, applications servers 4001-400N, a system process space 402, tenant process spaces 404, a tenant management process space 410, a tenant storage area 412, a user storage 414, and application metadata 416. In other embodiments, the environment 310 may not have the same elements as those listed above and/or may have other elements instead of, or in addition to, those listed above.

The user systems 312, the network 314, the system 316, the tenant data storage 322, and the system data storage 324 were discussed above in FIG. 3. Regarding the user systems 312, the processor system 312A may be any combination of one or more processors. The memory system 312B may be any combination of one or more memory devices, short term, and/or long term memory. The input system 312C may be any combination of input devices, such as one or more keyboards, mice, trackballs, scanners, cameras, and/or interfaces to networks. The output system 312D may be any combination of output devices, such as one or more monitors, printers, and/or interfaces to networks. As shown by FIG. 4, the system 316 may include the network interface 320 (of FIG. 3) implemented as a set of HTTP application servers 400, the application platform 318, the tenant data storage 322, and the system data storage 324. Also shown is the system process space 402, including individual tenant process spaces 404 and the tenant management process space 410. Each application server 400 may be configured to access tenant data storage 322 and the tenant data 323 therein, and the system data storage 324 and the system data 325 therein to serve requests of the user systems 312. The tenant data 323 might be divided into individual tenant storage areas 412, which can be either a physical arrangement and/or a logical arrangement of data. Within each tenant storage area 412, the user storage 414 and the application metadata 416 might be similarly allocated for each user. For example, a copy of a user's most recently used (MRU) items might be stored to the user storage 414. Similarly, a copy of MRU items for an entire organization that is a tenant might be stored to the tenant storage area 412. The UI 430 provides a user interface and the API 432 provides an application programmer interface to the system 316 resident processes to users and/or developers at the user systems 312. The tenant data and the system data may be stored in various databases, such as one or more Oracle™ databases.

The application platform 318 includes the application setup mechanism 438 that supports application developers' creation and management of applications, which may be saved as metadata into the tenant data storage 322 by the save routines 436 for execution by subscribers as one or more tenant process spaces 404 managed by the tenant management process 410 for example. Invocations to such applications may be coded using the PL/SOQL 434 that provides a programming language style interface extension to the API 432. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 416 for the subscriber making the invocation and executing the metadata as an application in a virtual machine.

Each application server 400 may be communicably coupled to database systems, e.g., having access to the system data 325 and the tenant data 323, via a different network connection. For example, one application server 4001 might be coupled via the network 314 (e.g., the Internet), another application server 400N-1 might be coupled via a direct network link, and another application server 400N might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, the system 316 is multi-tenant, wherein the system 316 handles storage of, and access to, different objects, data and applications across disparate users and organizations.

As an example of storage, one tenant might be a company that employs a sales force where each salesperson uses the system 316 to manage their sales process. Thus, a user might maintain contact data, leads data, customer follow-up data, performance data, goals and progress data, etc., all applicable to that user's personal sales process (e.g., in the tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 316 might also maintain system level data usable by multiple tenants or other data. Such system level data might include industry reports, news, postings, and the like that are sharable among tenants.

In certain embodiments, the user systems 312 (which may be client systems) communicate with the application servers 400 to request and update system-level and tenant-level data from the system 316 that may require sending one or more queries to the tenant data storage 322 and/or the system data storage 324. The system 316 (e.g., an application server 400 in the system 316) automatically generates one or more SQL statements (e.g., one or more SQL queries) that are designed to access the desired information. The system data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for matching objects using keys based on match rules, the apparatus comprising:
   one or more processors; and
   a non-transitory computer readable medium storing a plurality of instructions, which when executed, cause the one or more processors to:
   generate a match rule key based on a match rule, wherein the match rule specifies whether two objects match;
   create a plurality of candidate keys by applying the match rule key to a plurality of data objects;
   create a probe key by applying the match rule key to a probe object;
   determine whether the probe key matches a candidate key of the plurality of candidate keys;
   determine whether the probe object matches a candidate object based on applying the match rule to the probe object and the candidate object in response to a determination that the probe key matches the candidate key corresponding to the candidate object; and identify the probe object and the candidate object as matching based on the match rule in response to a determination that the probe object matches the candidate object, the match rule identifying a match of the probe object and the candidate object unless both the probe object and the candidate object have corresponding non-empty fields that lack a match.

2. The system of claim 1, wherein the match rule is expressed in disjunctive normal form.

3. The system of claim 1, wherein at least one of the probe key matching any candidate database key and the probe object matching a candidate object is based on at least one of an exact match and fuzzy matching.

4. The system of claim 1, wherein the match rule identifies a match based on a null value for a field of the probe object deemed as matching a null value for a field of the candidate object.

5. The system of claim 1, wherein the match rule identifies a match based on a corresponding field of the probe object and the candidate object having matching non-empty values.

6. The system of claim 1, wherein the plurality of data objects comprises a plurality of customer relationship management objects.

7. A computer program product comprising computer-readable program code to be executed by one or more processors when retrieved from a non-transitory computer-readable medium, the program code including instructions to:

generate a match rule key based on a match rule, wherein the match rule specifies whether two objects match;

create a plurality of candidate keys by applying the match rule key to a plurality of data objects;

create a probe key by applying the match rule key to a probe object;

determine whether the probe key matches a candidate key of the plurality of candidate keys;

determine whether the probe object matches a candidate object based on applying the match rule to the probe object and the candidate object in response to a determination that the probe key matches the candidate key corresponding to the candidate object; and identify the probe object and the candidate object as matching based on the match rule in response to a determination that the probe object matches the candidate object, the match rule identifying a match of the probe object and the candidate object unless both the probe object and the candidate object have corresponding non-empty fields that lack a match.

8. The computer program product of claim 7, wherein the match rule is expressed in disjunctive normal form.

9. The computer program product of claim 7, wherein at least one of the probe key matching any candidate database key and the probe object matching a candidate object is based on at least one of an exact match and fuzzy matching.

10. The computer program product of claim 7, wherein the match rule identifies a match based on a null value for a field of the probe object deemed as matching a null value for a field of the candidate object.

11. The computer program product of claim 7, wherein the match rule identifies a match based on a corresponding field of the probe object and the candidate object having matching non-empty values.

12. The computer program product of claim 7, wherein the plurality of data objects comprises a plurality of customer relationship management objects.

13. A method for matching objects using keys based on match rules, the method comprising:

generating a match rule key based on a match rule, wherein the match rule specifies whether two objects match;

creating a plurality of candidate keys by applying the match rule key to a plurality of data objects;

creating a probe key by applying the match rule key to a probe object;

determining whether the probe key matches a candidate key of the plurality of candidate keys;

determining whether the probe object matches a candidate object based on applying the match rule to the probe object and the candidate object in response to a determination that the probe key matches the candidate key corresponding to the candidate object; and identifying the probe object and the candidate object as matching based on the match rule in response to a determination that the probe object matches the candidate object, the match rule identifying a match of the probe object and the candidate object unless both the probe object and the candidate object have corresponding non-empty fields that lack a match.

14. The method of claim 13, wherein the match rule is expressed in disjunctive normal form.

15. The method of claim 13, wherein at least one of the probe key matching any candidate database key and the probe object matching a candidate object is based on at least one of an exact match and fuzzy matching.

16. The method of claim 13, wherein the match rule identifies a match based on a null value for a field of the probe object deemed as matching a null value for a field of the candidate object.

17. The method of claim 13, wherein the match rule identifies a match based on a corresponding field of the probe object and the candidate object having matching non-empty values.

* * * * *